United States Patent
Gallegos-Lopez

(10) Patent No.: US 8,278,850 B2
(45) Date of Patent: Oct. 2, 2012

(54) METHODS, SYSTEMS AND APPARATUS FOR OPTIMIZATION OF THIRD HARMONIC CURRENT INJECTION IN A MULTI-PHASE MACHINE

(75) Inventor: Gabriel Gallegos-Lopez, Torrance, CA (US)

(73) Assignee: GM Global Technology Operations LLC, Detroit, MI (US)

(*) Notice: Subject to any disclaimer, the term of this patent is extended or adjusted under 35 U.S.C. 154(b) by 389 days.

(21) Appl. No.: 12/720,338

(22) Filed: Mar. 9, 2010

(65) Prior Publication Data
US 2011/0221365 A1 Sep. 15, 2011

(51) Int. Cl.
*H02P 21/00* (2006.01)
(52) U.S. Cl. .............. 318/400.02; 318/400.17; 318/496; 318/500
(58) Field of Classification Search .............. 318/162, 318/400.02, 400.12, 400.17, 400.2, 496, 318/504, 599, 611, 629
See application file for complete search history.

(56) References Cited

U.S. PATENT DOCUMENTS

| | | | |
|---|---|---|---|
| 5,019,766 A * | 5/1991 | Hsu et al. | 318/807 |
| 5,053,689 A * | 10/1991 | Woodson et al. | 318/705 |
| 5,184,057 A * | 2/1993 | Sakai et al. | 318/803 |
| 5,194,796 A * | 3/1993 | Domeki et al. | 318/696 |
| 6,426,605 B1 | 7/2002 | Toliyat et al. | |
| 6,614,202 B2 | 9/2003 | Edelson | |
| 6,710,495 B2 | 3/2004 | Lipo et al. | |
| 7,075,265 B2 * | 7/2006 | Edelson | 318/801 |
| 7,733,044 B2 * | 6/2010 | Nakamura et al. | 318/400.02 |
| 2008/0042606 A1 | 2/2008 | Chen | |

* cited by examiner

*Primary Examiner* — Bentsu Ro
(74) *Attorney, Agent, or Firm* — Ingrassia Fisher & Lorenz, P.C.

(57) ABSTRACT

Methods, system and apparatus are provided for increasing voltage utilization in a five-phase vector controlled machine drive system that employs third harmonic current injection to increase torque and power output by a five-phase machine. To do so, a fundamental current angle of a fundamental current vector is optimized for each particular torque-speed of operating point of the five-phase machine.

20 Claims, 5 Drawing Sheets

METHODS, SYSTEMS AND APPARATUS FOR OPTIMIZATION OF THIRD HARMONIC CURRENT INJECTION IN A MULTI-PHASE MACHINE

STATEMENT REGARDING FEDERALLY SPONSORED RESEARCH OR DEVELOPMENT

This invention was made with Government support under DE-FC26-07NT43123, awarded by the US-Department of Energy The Government has certain rights in this invention.

TECHNICAL FIELD

Embodiments of the present invention generally relate to multi-phase systems, such as those that implement five-phase machines, and more particularly relate to techniques for controlling operation of such multi-phase systems to optimize third harmonic current injection and thus maximize voltage usage in a multi-phase machine.

BACKGROUND OF THE INVENTION

Electric machines are utilized in a wide variety of applications. For example, hybrid/electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Traditional HEVs implement a three-phase pulse width modulated (PWM) inverter module, which drives a three-phase AC machine (e.g., AC motor).

Many modern high performance AC motor drives use the principle of field oriented control (FOC) or "vector" control to control operation of the AC electric motor. In particular, vector control is often used in variable frequency drives to control the torque applied to the shaft (and thus finally the speed) of an AC electric motor by controlling the current fed to the AC electric motor. In short, stator phase currents are measured and converted into a corresponding complex space vector. This current vector is then transformed to a coordinate system rotating with the rotor of the AC electric motor.

Recently, researchers have investigated the possibility of using multi-phase machines in various applications including hybrid/electric vehicles. Higher-order multi-phase systems are characterized by additional degrees of freedom and better reliability in comparison to conventional three-phase machines, as well as by their enhanced torque producing capability.

As used herein, the term "multi-phase" refers to more than three-phases, and can be used in reference to AC electric machines that have five or more phases. One example of a multi-phase system is a five-phase system that includes a five-phase PWM inverter module that drives one or more five-phase AC machine(s). While the possibility of using five-phase systems in HEVs is being explored, a lot of work remains to be done before these inverter and motor configurations can actually be implemented particularly with respect to vector control techniques used in conjunction with such five-phase systems.

To improve dynamic performance of a multi-phase machine it is desirable to improve or increase the available mechanical torque/power that is generated and output by the multi-phase machine. One way to improve output torque (and hence machine efficiency) is to improve utilization of the inverter output voltage (also referred to as phase voltage) that is provided to the multi-phase machine.

It is well-known that addition of odd harmonics of appropriate amplitude to a fundamental wave can improve performance of a multi-phase system. For example, a well-known technique for enhancing the performance of a multi-phase machine and improving its torque producing capability and power output is commonly referred to as "third-harmonic current injection." In third harmonic current injection, a fundamental current command and its third harmonic are used to generate voltage commands that are supplied to the multi-phase machine. Among other things, third-harmonic current injection can be used to increase the inverter output voltage and increase flux per pole of a multi-phase machine.

Accordingly, it is desirable to provide methods, systems and apparatus for controlling operation of multi-phase AC machines that are powered by a multi-phase PWM inverter module. It would also be desirable to control, optimize and/or maximize voltage utilization when using third harmonic current injection since this can help increase torque/power output from a multi-phase machine. Furthermore, other desirable features and characteristics of the present invention will become apparent from the subsequent detailed description and the appended claims, taken in conjunction with the accompanying drawings and the foregoing technical field and background.

SUMMARY

Embodiments of the present invention relate to methods, systems and apparatus for improving voltage utilization in a five-phase vector controlled machine drive system that employs third harmonic current injection to increase torque and power output by a five-phase machine. According to one embodiment a particular combination inputs comprising a torque command, angular speed of a rotor of the five-phase machine, and a DC input voltage are used to generate an optimized fundamental current angle of a fundamental current vector.

For example, in one implementation, the particular combination of inputs is used to generate a first value for a total root mean square (RMS) current that corresponds to the particular combination of inputs, a second value for a third harmonic current injection factor, a third value for a third harmonic current angle, and a fourth value of the fundamental current angle. The first value for the total RMS current corresponds to a particular torque/speed operating point that is defined based on the particular combination of inputs. The second value and the third value are optimized to reduce and/or optimize the fourth value of the fundamental current angle. Reducing and/or optimizing the fourth value of the fundamental current angle can increase/maximize a value of a ratio of torque-to-total RMS phase current at the first value of the total RMS current. This improves phase voltage utilization by the five-phase machine. For instance, when the five-phase machine operates in its field-weakening region (medium/high speed range), the phase voltage available is a constraint which is function of DC input voltage, and in accordance with the disclosed embodiment, the first value for total RMS current can be decreased/minimized at a particular torque/speed when all the phase voltage is used.

Based on the total RMS current and the third harmonic current injection factor, a third harmonic RMS current signal and a fundamental RMS current signal can be generated. The third harmonic RMS current signal and the fundamental RMS current signal can then be used along with the fundamental current angle and the third harmonic current angle to generate a plurality of synchronous reference frame current command signals comprising: fundamental synchronous reference frame current command signals and third harmonic synchronous reference frame current command signals.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

Figure 1:
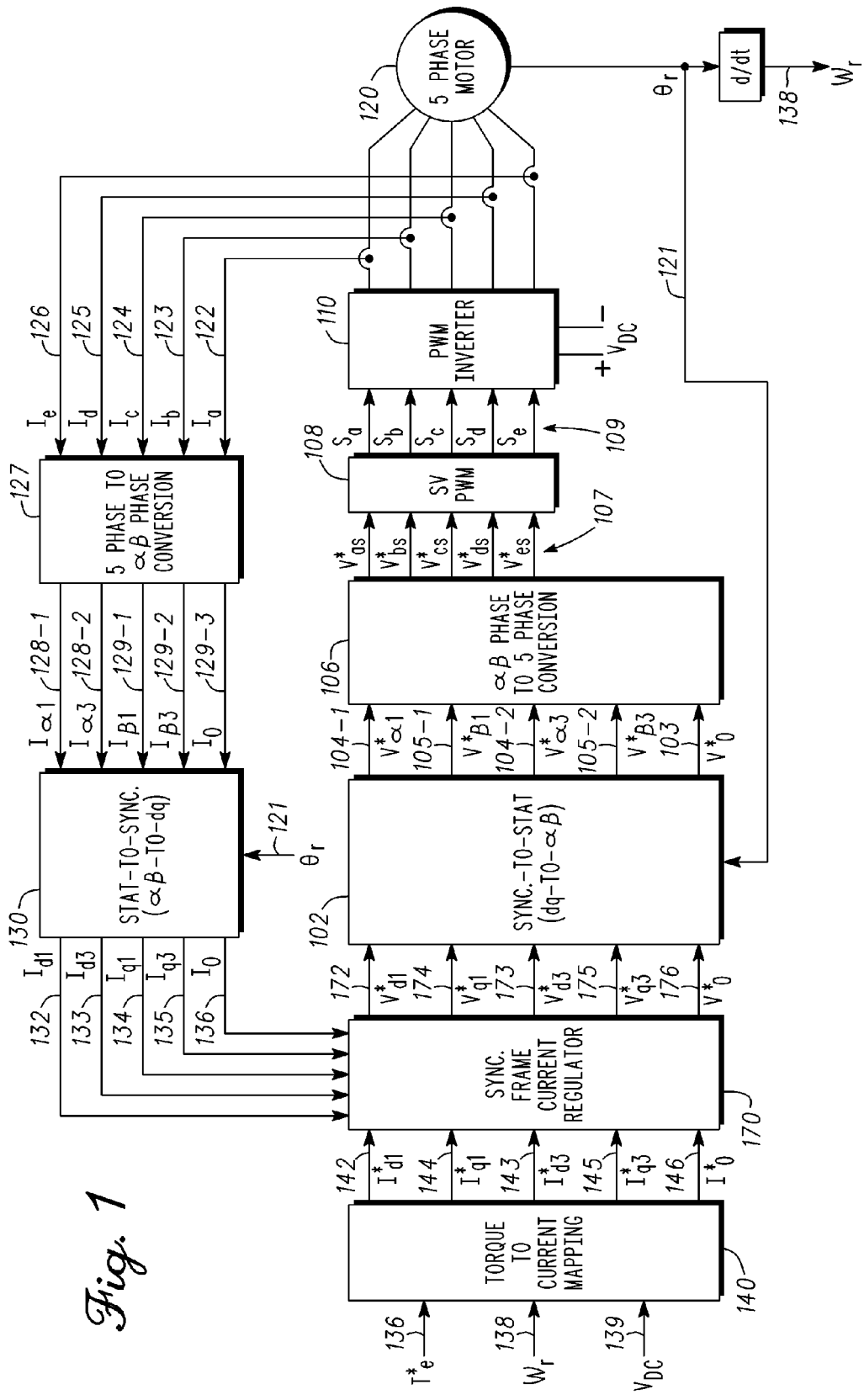
FIG. 1 is a block diagram of a vector controlled motor drive system in accordance with some embodiments of the present invention.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Overview

Before describing in detail embodiments that are in accordance with the present invention, it should be observed that the embodiments relate to controlling operation of a multi-phase system to maximize phase voltage usage by a multi-phase machine. In this regard, embodiments of the present invention relate to methods, systems and apparatus for controlling operation of a multi-phase system to maximize voltage usage by a multi-phase machine. The disclosed methods, systems and apparatus for controlling operation of such multi-phase systems to maximize voltage usage by a multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an AC. In some implementations, an AC motor includes an outside stationary stator having coils supplied with alternating current to produce a rotating magnetic field, and an inside rotor attached to the output shaft that is given a torque by the rotating field. In implementations where the AC machine is a five-phase permanent magnet synchronous AC motor this should be understood to encompass Interior Permanent Magnet Synchronous Motors (IPMSM), Surface Mount Permanent Magnet Synchronous Motors (SMPMSM) and Reluctance Motors.

FIG. 1 is a block diagram of one example of a vector controlled motor drive system 100. The system 100 controls a five-phase AC machine 120 via a five-phase pulse width modulated (PWM) inverter module 110 coupled to the five-phase AC machine 120 so that the five-phase AC machine 120 can efficiently use a DC input voltage (Vdc) provided to the five-phase PWM inverter module 110 by adjusting current commands that control the five-phase AC machine 120. In one particular implementation, the vector controlled motor drive system 100 can be used to control torque in an HEV.

In the following description of one particular non-limiting implementation, the five-phase AC machine 120 is described as a five-phase AC powered motor 120, and in particular a five-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes five or more phases. Thus, although the embodiment in FIG. 1 will be described with reference to a five-phase system, those skilled in the art will appreciate that the inventive concepts can be applied to other multi-phase systems (e.g., a six-phase system). Accordingly, the disclosed embodiments should not be interpreted as being limited to five-phase systems, but should be interpreted as being applicable to multi-phase systems that have five or more phases.

The five-phase AC motor 120 is coupled to the five-phase PWM inverter module 110 via five inverter poles and generates mechanical power (Torque×Speed) based on five-phase sinusoidal voltage signals received from the PWM inverter module 110. In some implementations, the angular position of a rotor (θr) of the first five-phase AC motor 120 or "shaft position" is measured using a position sensor (not illustrated), and in other implementations, the angular position of a rotor (θr) of the first five-phase AC motor 120 can be estimated without using a position sensor by using sensorless position estimation techniques.

Figure 2:
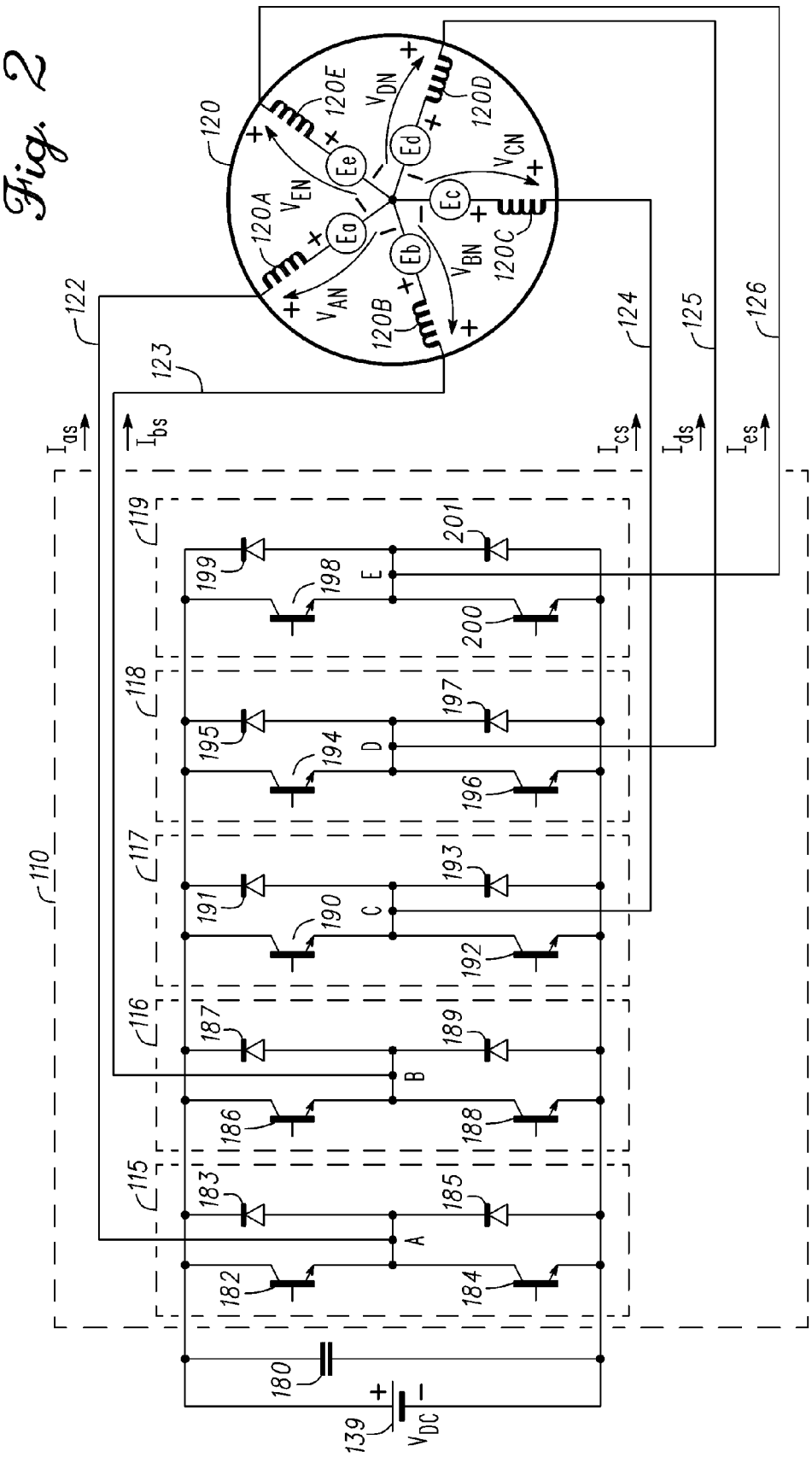
FIG. 2 is a block diagram of a portion of a motor drive system of FIG. 1 including a five-phase voltage source inverter connected to a five-phase AC motor.

Prior to describing operation details of the system 100, a more detailed description of one exemplary implementation of the five-phase voltage source inverter 110 will be provided (including how it is connected to the five-phase AC motor 120) with reference to FIG. 2. FIG. 2 is a block diagram of a portion of a motor drive system including a five-phase voltage source inverter 110 connected to a five-phase AC motor 120. It should be noted that the five-phase voltage source inverter 110 and the five-phase motor 120 in FIG. 1 are not limited to this implementation; rather, FIG. 2 is merely one example of how the five-phase voltage source inverter 110 and the five-phase motor 120 in FIG. 1 could be implemented in one particular embodiment.

As illustrated in FIG. 2, the five-phase AC motor 120 has five stator or motor windings 120a, 120b, 120c, 120d, 120e connected to motor terminals A, B, C, D, E, and the five-phase PWM inverter module 110 includes a capacitor 180 and five inverter sub-modules 115-119. In this embodiment, in phase A the inverter sub-module 115 is coupled to motor winding 120a, in phase B the inverter sub-module 116 is coupled to motor winding 120b, in phase C the inverter sub-module 117 is coupled to motor winding 120c, in phase D the inverter sub-module 118 is coupled to motor winding 120d, and in phase E the inverter sub-module 119 is coupled to motor winding 120e. The motor windings A, B, C, D, E (120a, 120b, 120c, 120d, 120e) are coupled together at a neutral point (N). The current into motor winding A 120a flows out motor windings B-E 120b-120e, the current into motor winding B 120b flows out motor windings A, C, D, E 120a and 120c-e, the current into motor winding C 120c flows out motor windings A, B, D, E 120a, 120b, 120d, 120e, the current into motor winding D 120d flows out motor windings A, B, C, E 120a-c and 120e and the current into motor winding E 120e flows out motor windings A-D 120a-d.

The resultant phase or stator currents (Ia-Ie) 122, 123, 124, 125, 126 flow through respective stator windings 120a-e. The phase to neutral voltages across each of the stator windings 120a-120e are respectively designated as $V_{an}$, $V_{bn}$, $V_{cn}$, $V_{dn}$, $V_{en}$, with the back electromagnetic force (EMF) voltages generated in each of the stator windings 120a-120e respectively shown as the voltages $E_a$, $E_b$, $E_c$, $E_d$, $E_e$ produced by ideal voltage sources, each respectively shown connected in series with stator windings 120a-120e. As is well known, these back EMF voltages $E_a$, $E_b$, $E_c$, $E_d$, $E_e$ are the voltages induced in the respective stator windings 120a-120e by the rotation of the rotor. Although not shown, the motor 120 is coupled to a drive shaft.

The inverter 110 includes a capacitor 180, a first inverter sub-module 115 comprising a dual switch 182/183, 184/185, a second inverter sub-module 116 comprising a dual switch 186/187, 188/189, a third inverter sub-module 117 comprising a dual switch 190/191, 192/193, a fourth inverter sub-module 118 comprising a dual switch 194/195, 196/197, and a fifth inverter sub-module 119 comprising a dual switch 198/199, 200/201. As such, inverter module 110 has ten solid state controlled switching devices 182, 184, 186, 188, 190, 192, 194, 196, 198, 200 and ten diodes 183, 185, 187, 189, 191, 193, 195, 197, 199, 201 to appropriately switch compound voltage ($V_{IN}$) and provide five-phase energization of the stator windings 120a, 120b, 120c, 120d, 120e of the five-phase AC motor 120.

Although not illustrated in FIG. 2, switching signals control the switching of solid state switching devices 182, 184, 186, 188, 190, 192, 194, 196, 198, 200 within the inverter sub-modules 115-119. By providing appropriate switching signals to the individual inverter sub-modules 115-119, switching of solid state controlled switching devices 182, 184, 186, 188, 190, 192, 194, 196, 198, 200 within the inverter sub-modules 115-119 can be controlled to control the outputs of the inverter sub-modules 115-119 that are provided to motor windings 120a-120e, respectively. The resultant five-phase stator currents (Ia . . . Ie) 122-126 that are generated by the inverter sub-modules 115-119 of the five-phase inverter module 110 are provided to motor windings 120a, 120b, 120c, 120d, 120e. The voltages as $V_{an}$, $V_{bn}$, $V_{cn}$, $V_{dn}$, $V_{en}$, $E_a$, $E_b$, $E_c$, $E_d$, $E_e$ and the voltage at node N fluctuate over time depending on the open/close states of switches 182, 184, 186, 188, 190, 192, 194, 196, 198, 200 in the inverter sub-modules 115-119 of the inverter module 110, as will be described below.

Referring again to FIG. 1, the vector control motor drive system 100 includes a torque-to-current mapping module, a synchronous (SYNC.) frame current regulator module 170, a synchronous-to-stationary (SYNC-TO-STAT.) transformation module 102, a five-phase-to-five-phase transformation module 106, a Space Vector (SV) PWM module 108, a five-phase PWM inverter 110, a five-phase-to-five-phase transformation module 127, and a stationary-to-synchronous (STAT-TO-SYNC.) transformation module 130. As used herein the term "module" refers to a device, a circuit, an electrical component, and/or a software based component for performing a task.

The torque-to-current mapping module receives a torque command, angular rotation speed (ωr) of the shaft, and the DC input (or "link") voltage as inputs. In one implementation, the angular rotation speed (ωr) of the shaft can be generated based on the derivative of a rotor/shaft position output (θr) 121. Depending upon implementation the torque-to-current mapping module may also receive a variety of other system parameters. The torque-to-current mapping module uses the inputs to map the torque command to a fundamental d-axis current command signal (Id1*) 142, a third harmonic d-axis current command signal (Id3*) 143, a fundamental q-axis current command signal (Iq1*) 144, a third harmonic q-axis current command signal (Iq3*) 145, and a zero sequence current command signal (I0*) 146. These current command signals will cause the motor 120 to generate the commanded torque (Te*) at speed (ωr). The synchronous reference frame current command signals 142-146 are DC commands that have a constant value as a function of time. Because the current commands are DC signals in the synchronous reference frame it is easier to regulate current commands. Further details regarding the torque-to-current mapping module will be described below with reference to FIG. 3.

The five-to-αβ phase transformation module 127 receives the measured five-phase stationary reference frame stator currents (Ia . . . Ie) 122-126 that are feedback from motor 120. The five-to-αβ phase transformation module 127 uses these five-phase stationary reference frame feedback stator currents 122-126 and performs an abcde reference frame-to-αβ reference frame transformation to transform the five-phase stationary reference frame feedback stator currents 122-126 into αβ stationary reference frame stator currents (Iα1, Iα3, Iβ1, Iβ3, I0) 128-1, 128-2, 129-1, 129-2, 129-3. The five-to-αβ phase transformation can be performed using the matrices defined in equation (1) below.

$$\begin{bmatrix} I_{\alpha 1} \\ I_{\beta 1} \\ I_{\alpha 3} \\ I_{\beta 3} \\ I_0 \end{bmatrix} = \frac{2}{5} \begin{bmatrix} 1 & \cos\left(\frac{2\pi}{5}\right) & \cos\left(\frac{4\pi}{5}\right) & \cos\left(\frac{4\pi}{5}\right) & \cos\left(\frac{2\pi}{5}\right) \\ 0 & \sin\left(\frac{2\pi}{5}\right) & \sin\left(\frac{4\pi}{5}\right) & -\sin\left(\frac{4\pi}{5}\right) & -\sin\left(\frac{2\pi}{5}\right) \\ 1 & \cos\left(\frac{4\pi}{5}\right) & \cos\left(\frac{2\pi}{5}\right) & \cos\left(\frac{2\pi}{5}\right) & \cos\left(\frac{4\pi}{5}\right) \\ 0 & -\sin\left(\frac{4\pi}{5}\right) & \sin\left(\frac{2\pi}{5}\right) & -\sin\left(\frac{2\pi}{5}\right) & \sin\left(\frac{4\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix} \times \begin{bmatrix} I_a \\ I_b \\ I_c \\ I_d \\ I_e \end{bmatrix} \quad (1)$$

In equation (1) the column vector that represents the five-phase stationary reference frame feedback stator currents 122-126 is multiplied by a transformation matrix and scaling factor to generate a column vector that represents the αβ stationary reference frame stator currents (Iα1, Iα3, Iβ1, Iβ3, I0) 128-1, 128-2, 129-1, 129-2, 129-3.

The stationary-to-synchronous transformation module 130 receives the αβ stationary reference frame stator currents (Iα1, Iα3, Iβ1, Iβ3, I0) 128-1, 128-2, 129-1, 129-2, 129-3 and the rotor angular position (θr) 121 and transforms them to a fundamental synchronous reference frame d-axis current signal (Id1) 132, a third harmonic synchronous reference frame d-axis current signal (Id3) 133, a fundamental synchronous reference frame q-axis current signal (Iq1) 134, a third harmonic synchronous reference frame q-axis current signal (Iq3) 135 and a synchronous reference frame zero sequence current signal (I0) 136. The d1q1 reference frame rotates at synchronous speed, whereas the d3q3 reference frame rotates at three times synchronous speed. The process of stationary-to-synchronous conversion is well-known in the art and for sake of brevity will not be described in detail. In one implementation, the stationary-to-synchronous transformation can be performed using equation (2) below.

$$\begin{bmatrix} I_{d1} \\ I_{q1} \\ I_{d3} \\ I_{q3} \\ I_0 \end{bmatrix} = \begin{bmatrix} M(\theta_e) & 0 & 0 \\ 0 & M(3\theta_e) & 0 \\ 0 & 0 & 1 \end{bmatrix} \times \begin{bmatrix} I_{\alpha 1} \\ I_{\beta 1} \\ I_{\alpha 3} \\ I_{\beta 3} \\ I_0 \end{bmatrix}, \quad (2)$$

where $$M(\theta_e) = \begin{bmatrix} \cos\theta_e & \sin\theta_e \\ -\sin\theta_e & \cos\theta_e \end{bmatrix}$$

and $$M(3\theta_e) = \begin{bmatrix} \cos 3\theta_e & \sin 3\theta_e \\ -\sin 3\theta_e & \cos 3\theta_e \end{bmatrix}$$

$M(\theta_e)$ is a matrix that is a function of electrical angular position, θe, and M(3θe) represents that the electrical angular position, θe, is multiplied by three to represent the third harmonic function. The electrical angular position, θe, represents the electrical position, which is the product of the pole pair and rotor angular position, r. The synchronous frame current regulator module 170 receives the fundamental synchronous reference frame d-axis current signal (Id1) 132, the third harmonic synchronous reference frame d-axis current signal (Id3) 133, the fundamental synchronous reference frame q-axis current signal (Iq1) 134, the third harmonic synchronous reference frame q-axis current signal (Iq3) 135, the synchronous reference frame zero sequence current signal (I0) 136, the fundamental d-axis current command signal (Id1*) 142, the third harmonic d-axis current command signal (Id3*) 143, the fundamental q-axis current command signal (Iq1*) 144, the third harmonic q-axis current command signal (Iq3*) 145, the zero sequence current command signal (I0*) 146, and uses these signals to generate a fundamental d-axis voltage command signal (Vd1*) 172, a third harmonic d-axis voltage command signal (Vd3*) 173, a fundamental q-axis voltage command signal (Vq1*) 174, a third harmonic q-axis voltage command signal (Vq3*) 175, and a zero sequence voltage command signal (V0*) 176. The voltage command signals 172-176 are also synchronous reference frame signals and are therefore DC commands that have a constant value as a function of time. The process of current to voltage conversion can be implemented as a Proportional-Integral (PI) controller, which is well-known in the art and for sake of brevity will not be described here in detail. Instead, further details regarding the current to voltage conversion performed by the synchronous frame current regulator module 170 will be described below with reference to FIG. 3.

As its inputs the synchronous-to-stationary transformation module 102 receives the synchronous reference frame voltage command signals 172-176 from the synchronous frame current regulator module 170, and the rotor position output (θr) 121. In response to these inputs, the synchronous-to-stationary transformation module 102 performs a dq-to-αβ transformation based on these signals to generate a fundamental α-axis stationary reference frame voltage command signal (Vα1*) 104-1, a fundamental β-axis stationary reference frame voltage command signal (Vβ1*) 105-1, a third harmonic α-axis stationary reference frame voltage command signal (Vα3*) 104-2, a third harmonic β-axis stationary reference frame voltage command signal (Vβ3*) 105-2, and a zero sequence voltage command signal (V0*) 103. These voltage command signals are in the stationary reference frame and therefore have values that vary as a sine wave as a function of time. The process of synchronous-to-stationary transformation is well-known in the art and for sake of brevity will not be described in detail. In one implementation, the synchronous-to-stationary transformation can be performed using equation (3) below.

$$\begin{bmatrix} V_{\alpha 1}^* \\ V_{\beta 1}^* \\ V_{\alpha 3}^* \\ V_{\beta 3}^* \\ V_0^* \end{bmatrix} = \begin{bmatrix} M(\theta_e) & 0 & 0 \\ 0 & M(3\theta_e) & 0 \\ 0 & 0 & 1 \end{bmatrix}^{-1} \times \begin{bmatrix} V_{d1}^* \\ V_{q1}^* \\ V_{d3}^* \\ V_{q3}^* \\ V_0^* \end{bmatrix} \quad (3)$$

The αβ-to-five phase transformation module 106 receives the stationary reference frame voltage command signals (Vα1*, Vβ1*, Vα3*, Vβ3*, V0*) 103-105 generated by the synchronous-to-stationary transformation module 102, and based on these signals, generates five-phase stationary reference frame voltage command signals (Vas* ... Ves*) 107 that are sent to the Space Vector Pulse Width Modulation (SVPWM) module 200. The αβ-to-five phase transformation can be performed using the matrices defined in equation (4) below.

$$\begin{bmatrix} V_{as}^* \\ V_{bs}^* \\ V_{cs}^* \\ V_{ds}^* \\ V_{es}^* \end{bmatrix} = \frac{5}{2} \begin{bmatrix} 1 & \cos\left(\frac{2\pi}{5}\right) & \cos\left(\frac{4\pi}{5}\right) & \cos\left(\frac{4\pi}{5}\right) & \cos\left(\frac{2\pi}{5}\right) \\ 0 & \sin\left(\frac{2\pi}{5}\right) & \sin\left(\frac{4\pi}{5}\right) & -\sin\left(\frac{4\pi}{5}\right) & -\sin\left(\frac{2\pi}{5}\right) \\ 1 & \cos\left(\frac{4\pi}{5}\right) & \cos\left(\frac{2\pi}{5}\right) & \cos\left(\frac{2\pi}{5}\right) & \cos\left(\frac{4\pi}{5}\right) \\ 0 & -\sin\left(\frac{4\pi}{5}\right) & \sin\left(\frac{2\pi}{5}\right) & -\sin\left(\frac{2\pi}{5}\right) & \sin\left(\frac{4\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix}^{-1} \times \begin{bmatrix} V_{\alpha 1}^* \\ V_{\beta 1}^* \\ V_{\alpha 3}^* \\ V_{\beta 3}^* \\ V_0^* \end{bmatrix} \qquad (4)$$

In equation (4) the column vector that represents the stationary reference frame voltage command signals (Vα1*, Vβ1*, Vα3*, Vβ3*, V0*) 103-105 is multiplied by a transformation matrix and scaling factor to generate a column vector that represents the five-phase stationary reference frame voltage command signals (Vas* ... Ves*) 107.

The SVPWM module 108 is used for the control of pulse width modulation (PWM). The five-phase PWM inverter module 110 is coupled to the SVPWM module 108. The SVPWM module 108 receives the five-phase stationary reference frame voltage command signals (Vas* ... Ves*) 107 as inputs, and pulse width modulates (PWM) these signals to generate switching vector signals (Sa ... Se) 109, which it provides to the five-phase PWM inverter module 110. The particular SV modulation algorithm implemented in the SV PWM module 108 can be any known SV modulation algorithm. The switching vector signals (Sa ... Se) 109 control the switching states of switches in PWM inverter 110 to generate five-phase voltage commands. More specifically, the five-phase PWM inverter module 110 receives the DC input voltage (Vdc) and switching vector signals (Sa ... Se) 109, and uses them to generate five-phase alternating current (AC) voltage signal waveforms at inverter poles that drive the five-phase AC machine/motor 120 at varying speeds.

The five-phase permanent magnet synchronous motor 120 receives the five-phase voltage signals generated by the PWM inverter 110 and generates a motor output at the commanded torque Te* 136. In this one particular implementation, the motor 120 comprises a five-phase interior permanent-magnet synchronous motor (IPMSM) 120. The measured feedback stator currents (Ia-Ie) are sensed, sampled and provided to the five-to-two phase transformation module 127 as described above.

Although not illustrated in FIG. 1, the system 100 may also include a gear coupled to and driven by a shaft of the five-phase AC machine 120.

Torque-to-Current Conversion for Maximum Voltage Utilization by the Five-Phase Machine As described above, third harmonic current injection techniques can be used to improve torque and output power of a multi-phase machine. To help achieve the full benefits of these improvement it also is important to maximize/increase inverter output voltage (or "phase" voltage) that is output by the multi-phase inverter particularly when the multi-phase machine operates at medium to high speeds in the "field-weakening region" since it improves output power.

To maximize phase voltage utilization, it is desirable to maximize the ratio of output torque-to-RMS current in "field-weakening region." To maximize the ratio of output torque-to-total RMS phase current (Irmstotal*) for a given torque command, the total RMS phase current (Irmstotal*) should be minimized. Two components contribute to the total RMS phase current (Irmstotal*). One is the fundamental current and the other is the third harmonic current that is injected. The fundamental current makes up the largest percentage of the total RMS phase current (Irmstotal*), and therefore it is this component that should be reduced. As will be explained below, the ratio of output torque-to-RMS current in "field-weakening region" can be improved by either increasing the magnitude (I1) (where magnitude means its peak value, not RMS value) or angle (β1) of the fundamental current vector.

As will now be described below with reference to FIGS. 3-6, methods, systems and apparatus are provided for improving/maximizing voltage utilization in a multi-phase system that employs third harmonic current injection that can allows torque/power output by the multi-phase machine to be improved/increased.

Figure 3:
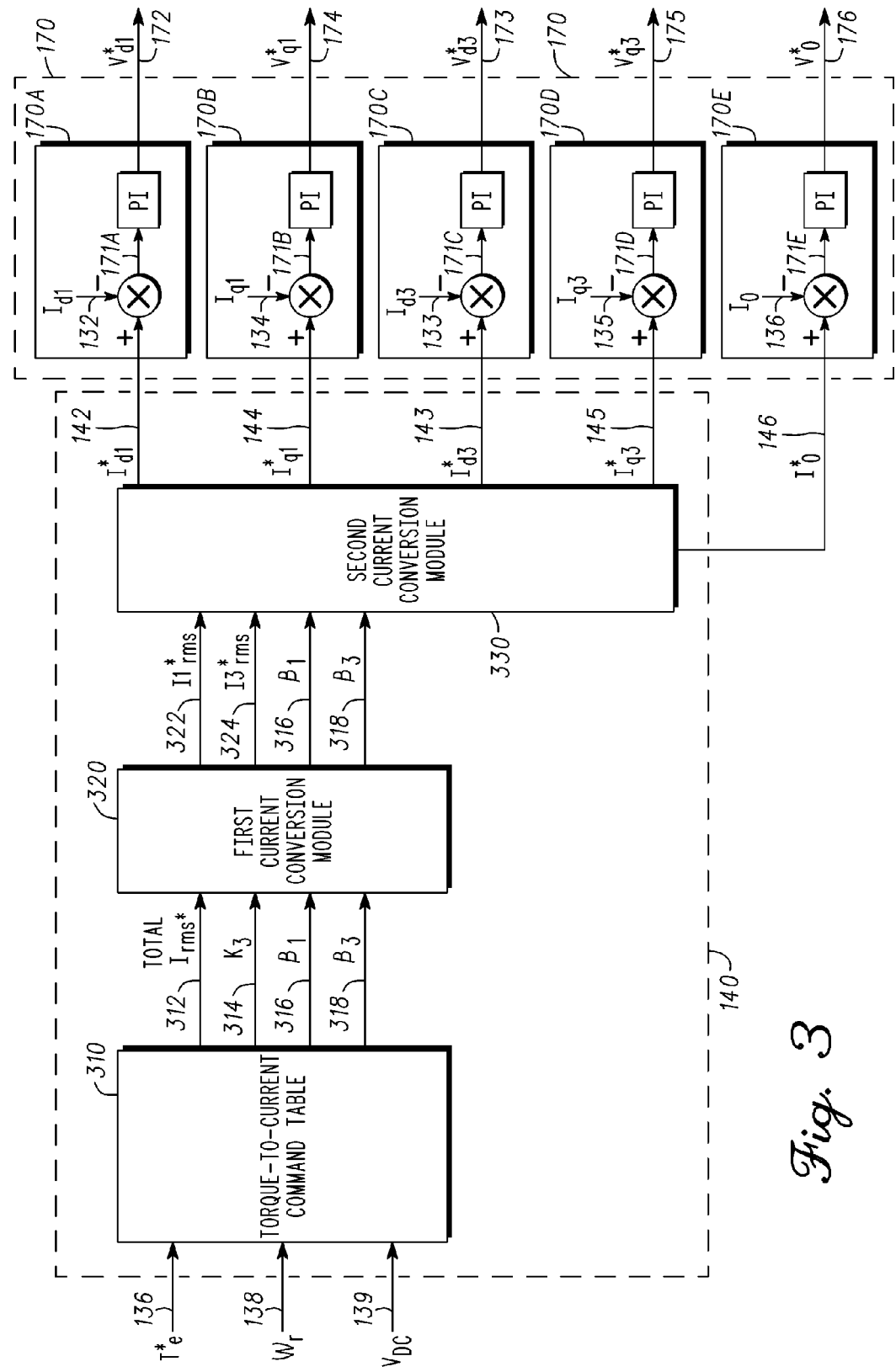
FIG. 3 is a block diagram illustrating further details of the torque-to-current mapping module and the synchronous frame current regulator module of the motor drive system in FIG. 1 in accordance with some of the disclosed embodiments.

FIG. 3 is a block diagram illustrating further details of the torque-to-current mapping module and the synchronous frame current regulator module 170 of the motor drive system 100 in FIG. 1 in accordance with some of the disclosed embodiments.

The torque-to-current mapping module includes a torque-to-current command table, a first current conversion module 320 and a second current conversion module 330.

The torque-to-current command table receives a torque command, angular speed (ωr) of the rotor/shaft, and the DC input voltage as inputs. These inputs will dictate a total RMS current signal for a given phase voltage (Vph) constraint and torque/speed operating point. In other words, total RMS current signal that is required to meet a particular torque/speed operating point is determined based on the particular torque command, the particular angular speed (ωr) of the rotor/shaft, and the particular DC input voltage) that are input. It is noted that the phase voltage (Vph) is equal to the sum of the fundamental and third harmonic voltages (V1, V3). Moreover, the phase voltage (Vph) is equal to $$\left(\frac{2}{\pi}\right) * MI * Vdc,$$

where MI is the modulation index (MI), Vdc is the DC input voltage. The modulation index has a value between 0 and 1. Torque and voltage equations (19-23) shown below have to be satisfied.

In accordance with the disclosed embodiments, the torque-to-current command table outputs values of a third harmonic current injection factor and a third harmonic current angle (β3) that allow for a fundamental current angle (β1) of the fundamental current vector to be minimized. As will be described below, this allows for the ratio of output torque-to-total RMS current to be maximized. In other words, for a particular value of the total RMS current signal, the torque-to-current command table is designed to adjust the third harmonic current injection factor and the third harmonic current angle (β3), while the phase voltage is kept at its maximum value during field-weakening region to minimize the fundamental current angle (β1).

As will be described in more detail below, minimizing the fundamental current angle (β1) maximizes the ratio of output torque-to-total RMS phase current (Newton-meters/Ampere RMS), while still producing the command torque, and therefore optimizes third harmonic current injection in the five-phase machine. As such, the torque-to-current command table is designed to generate values of β1, β3, and k3 that will maximize torque per ampere. Thus, the torque-to-current command table of FIG. 3 is designed with optimum combinations of the third harmonic current injection factor, the fundamental current angle (β1), and the third harmonic current angle (β3) for a particular total RMS current signal. Minimizing the value of the fundamental current angle (β1) of the fundamental current vector helps to ensure maximum voltage utilization and helps to provide for higher torque/power when utilizing third harmonic current injection in a multiphase machine. The benefits provided by these embodiments are even more pronounced when the multiphase machine operates in a field-weakening region. These embodiments are relatively easy to implement, calibrate and control.

Prior to describing the remaining details of FIG. 3, the relationships between various currents and voltages for both the fundamental and third harmonic will first be described with reference to equations (5) through (23).

Both the fundamental current and the third harmonic current can be represented as a vector having a magnitude and angle (β). In particular, the fundamental current can be represented in vector notation as (I1, β1), where I1 is the peak fundamental current, and β1 is the fundamental current angle. The peak fundamental current (I1), and the fundamental current angle (β1) can be computed based on the equations (5) and (6) below, where equation (5) also expresses a relationship between the fundamental RMS current (I1 rms*).

$$I1 = \sqrt{I_{d1}^{*2} + I_{q1}^{*2}} = \sqrt{2} \cdot I1_{rms}^* \quad (5)$$

$$\beta1 = \arctan\left(\frac{-I_{d1}^*}{I_{q1}^*}\right) \quad (6)$$

Given these relationships, the fundamental synchronous reference frame d-axis current signal (Id1*) 142, and the fundamental synchronous reference frame q-axis current signal (Iq1*) 144 can be expressed as indicated in equations (7) and (8) as follows:

$$Id1^* = -\sqrt{2} \cdot I1_{rms}^* \sin(\beta1) \quad (7)$$

$$Iq1^* = \sqrt{2} \cdot I1_{rms}^* \cos(\beta1) \quad (8)$$

The relationship between the fundamental RMS current (I1 rms*) and total RMS phase current (Irmstotal*) can be expressed in equation (9) as follows:

$$I1rms^* = Irmstotal^* \cdot \frac{1}{\sqrt{1+k_3^2}}, \quad (9)$$

where k3 is the third harmonic current injection factor (k3), which is a scaling factor that establishes the ratio between the fundamental RMS current (I1 rms*) and the third harmonic RMS current (I3 rms*), as will be described below.

In addition, the peak fundamental voltage (V1), and the fundamental voltage angle (φ1) can be computed based on the equations (10) and (11) below, where Vd1* is the fundamental d-axis voltage command signal (Vd1*) 172, and Vq1* is the fundamental q-axis voltage command signal (Vq1*) 174.

$$V1 = \sqrt{V_{d1}^{*2} + V_{q1}^{*2}} \quad (10)$$

$$\varphi_1 = \arctan\left(\frac{-V_{d1}^*}{V_{q1}^*}\right) \quad (11)$$

Likewise, the third harmonic current can be represented in vector notation as (I3, β3), where I3 is the peak third harmonic current, and β3 is the third harmonic current angle. The peak third harmonic current (I3), and the third harmonic current angle (β3) can be computed based on the equations (12) and (13) below, where equation (12) also expresses a relationship between the third harmonic RMS current (I3 rms*) and the peak third harmonic current (I3).

$$I3 = \sqrt{I_{d3}^{*2} + I_{q3}^{*2}} = \sqrt{2} \cdot I3_{rms}^* \quad (12)$$

$$\beta_3 = \arctan\left(\frac{-I_{d3}^*}{I_{q3}^*}\right) \quad (13)$$

Given these relationships, the third harmonic synchronous reference frame d-axis current signal (Id3*) 143, and the third harmonic synchronous reference frame q-axis current signal (Iq3*) 145 can be expressed as in indicated in equations (14) and (15) as follows:

$$Id3^* = -\sqrt{2} \cdot I3_{rms}^* \sin(\beta3) \quad (14)$$

$$Iq3^* = \sqrt{2} \cdot I3_{rms}^* \cos(\beta3) \quad (15)$$

The relationship between the third harmonic RMS current (I3 rms*) and total RMS phase current (Irmstotal*) can be expressed in equation (16) as follows:

$$I3rms^* = Irmstotal^* \cdot \frac{k_3}{\sqrt{1+k_3^2}}. \quad (16)$$

In addition, the peak third harmonic voltage (V3), and the third harmonic voltage angle (φ3) can be computed based on the equations (17) and (18) below, where Vd3* is the third harmonic d-axis voltage command signal (Vd3*) 173, and Vq3* is the third harmonic q-axis voltage command signal (Vq3*) 175.

$$V3 = \sqrt{V_{d3}^{*2} + V_{q3}^{*2}} \quad (17)$$

$$\varphi_3 = \arctan\left(\frac{-V_{d3}^*}{V_{q3}^*}\right) \quad (18)$$

In addition, torque can be computed based on equation (19) below $$\text{Torque} = T1 + T2 - T3, \text{ where} \quad (19)$$

$$T1 = \frac{5}{2}[\Psi_{f1} I_{q1}^* + (L_{d1} - L_{q1}) I_{d1}^* I_{q1}^*]$$

-continued $$T2 = \frac{15}{2}[\Psi_{f3}I^*_{q3} + (L_{d3} - L_{q3})I^*_{d3}I^*_{q3}]$$

$$T3 = 5L_{13}(I^*_{d3}I^*_{q1} - I^*_{q3}I^*_{d1}),$$

where Ld1, Lq1, Ld3, Ld3, L13 are the fundamental d-axis inductance (Ld1), fundamental q-axis inductance (Lq1), third harmonic d-axis inductance (Ld3), third harmonic q-axis inductance (Lq3), mutual inductance (L13), where $\Psi f1$, $\Psi f3$ are the fundamental flux linkage constant ($\Psi f1$) and the third harmonic flux linkage constant ($\Psi f3$).

Voltages (Vd1*, Vq1*, Vd3*, Vq3*) 172, 174, 173, 175 can be computed using equations (20) through (23) respectively as follows.

$$V_{d1}^* = -\omega_r \Psi_{sq1} = -\omega_r(L_{q1}I_{q1}^* + L_{13}I_{q3}^*) \quad (20)$$

$$V_{q1}^* = \omega_r \Psi_{sd1} = \omega_r(L_{d1}I_{d1}^* + L_{13}I_{d3}^* + \Psi_{f1}) \quad (21)$$

$$V_{d3}^* = -3\omega_r \Psi_{qs3} = -3\omega_r(L_{q3}I_{q3}^* + L_{31}I_{q1}) \quad (22)$$

$$V_{q3}^* = 3\omega_r \Psi_{ds3} = 3\omega_r(L_{d3}I_{d3}^* + L_{31}I_{d1}^* + \Psi_{f3}) \quad (23)$$

where $\Psi sq1$, $\Psi sd3$, $\Psi qs3$, $\Psi ds3$ are the fundamental q-axis flux linkage ($\Psi sq1$), the third harmonic d-axis flux linkage ($\Psi sd3$), the third harmonic q-axis flux linkage ($\Psi qs3$), the third harmonic d-axis flux linkage ($\Psi ds3$), respectively.

Remaining details of FIG. 3 will now be described. The first current conversion module 320 receives the total RMS current signal, the third harmonic current injection factor, the fundamental current angle (β1), and the third harmonic current angle (β3). The first current conversion module 320 converts the total RMS current signal and the third harmonic current injection factor into a third harmonic RMS current signal (I3 rms*) 324 and a fundamental RMS current signal (I1 rms*) using equations (24) and (25) below.

$$I3rms^* = Irms^* \cdot \frac{k3}{\sqrt{1+k3^2}} \quad (24)$$

$$I1rms^* = Irms^* \cdot \frac{1}{\sqrt{1+k3^2}} \quad (25)$$

The second current conversion module 320 receives the fundamental RMS current signal (I1 rms*), the third harmonic RMS current signal (I3 rms*) 324, the fundamental current angle (β1), and the third harmonic current angle (β3) and converts these inputs into a fundamental d-axis current command signal (Id1*) 142, a third harmonic d-axis current command signal (Id3*) 143, a fundamental q-axis current command signal (Iq1*) 144 and a third harmonic q-axis current command signal (Iq3*) 145 using equations (7), (8), (14) and (15) as described above.

$$Id1^* = -\sqrt{2} \cdot I1\,rms^* \cdot \sin(\beta 1) \quad (7)$$

$$Iq1^* = \sqrt{2} \cdot I1\,rms^* \cdot \cos(\beta 1) \quad (8)$$

$$Id3^* = -\sqrt{2} \cdot I3\,rms^* \cdot \sin(\beta 3) \quad (14)$$

$$Iq3^* = \sqrt{2} \cdot I3\,rms^* \cdot \cos(\beta 3) \quad (15)$$

The synchronous frame current regulator module 170 includes synchronous current regulator modules 170A-170E that are used to convert respective current command signals 142-146 to voltage command signals 172-176. In one implementation, each current regulator module 170 implements a Proportional-Integral (PI) controller that includes a summing junction and a proportional-integral (PI) controller module that are used to covert input current to voltage.

One summing junction subtracts the fundamental synchronous reference frame d-axis current signal (Id1) 132 from the fundamental d-axis current command signal (Id1*) 142 to generate a fundamental d-axis current error signal (Id1 error) 171A, which is then provided to PI controller module. Based on the fundamental d-axis current error signal (Id1 error) 171A, the PI controller module generates a fundamental d-axis voltage command signal (Vd1*) 172.

Another summing junction subtracts the third harmonic synchronous reference frame d-axis current signal (Id3) 133 from the third harmonic d-axis current command signal (Id3*) 143 to generate a third harmonic d-axis current error signal (Id3error) 171C, which is then provided to PI controller module. Based on the third harmonic d-axis current error signal (Id3error) 171C, the PI controller module generates a third harmonic d-axis voltage command signal (Vd3*) 173.

Another summing junction subtracts the fundamental synchronous reference frame q-axis current signal (Iq1) 134 from the fundamental q-axis current command signal (Iq1*) 144 to generate a fundamental q-axis current error signal (Iq1 error) 171B, which is then provided to PI controller module. Based on the fundamental q-axis current error signal (Iq1error) 171B, the PI controller module generates a fundamental q-axis voltage command signal (Vq1*) 174.

Another summing junction subtracts the third harmonic synchronous reference frame q-axis current signal (Iq3) 135 from the third harmonic q-axis current command signal (Iq3*) 145 to generate a third harmonic q-axis current error signal (Iq3error) 171D, which is then provided to PI controller module. Based on the third harmonic q-axis current error signal (Iq3error) 171D, the PI controller module generates a third harmonic q-axis voltage command signal (Vq3*) 175.

The voltage command signals 172-176 are then provided to 102 where processing of the voltage command signals 172-175 continues as described above.

As will be explained below with reference to FIGS. 4-6B, minimizing the value of the fundamental current angle (β1) produces better results than simply increasing magnitude of the fundamental current vector. The inventors observed that when third harmonic current injection is implemented in a multi-phase machine, the function that characterizes output torque-versus-total RMS phase current is more sensitive to changes in the angle (β1) of the fundamental current vector than to changes in magnitude of the fundamental current vector, and can therefore be maximized more easily by optimizing the angle (β1) (as opposed to minimizing the magnitude of the fundamental current vector). As an alternative to simply decreasing/minimizing the magnitude of a fundamental current vector, the fundamental current angle (β1) of the fundamental current vector is minimized to increase the ratio of torque-to-total RMS phase current ($I_{rmstotal}$) and to maximize voltage utilization in the multi-phase system.

As will also be described below with reference to FIGS. 4-6B, the output torque is a function of total RMS phase current. However, the ratio of output torque-to-total RMS phase current as function of current vector angle (β1) is a non-linear function that is highly dependent on machine design. For optimum performance there is a particular fundamental current vector angle (β1) that maximizes the ratio of output torque-to-total RMS phase current.

In one embodiment, the torque-to-current command table resolves a set of equations (torque and voltage equations (19) through (23) described above).

In some cases, it is impractical to solve these complex equations in real-time, and a look-up table is used instead that characterizes machine parameters to compute the values for the third harmonic current injection factor, the third harmonic current angle (β3) (and other machine and/or control parameters) that will minimize the fundamental current angle (β1) for a particular combination of torque command, angular speed (ωr) of the rotor/shaft, the DC input voltage and total RMS current signal ($I_{rmstotal}$), and thus maximize torque/ampere. Thus, in another embodiment, the torque-to-current command table is developed by experimentation and testing with respect to an actual five-phase machine. For a particular five-phase machine, operating characteristics can be measured during operation/testing to determine a minimum fundamental current vector angle (β1) for each combination of torque command, angular speed (ωr), and DC input voltage that increases the ratio of torque per total RMS current. Based on the measured results, the torque-to-current command table can then be populated with values for the third harmonic current injection factor and the third harmonic current angle (β3) that will minimize the fundamental current angle (β1) for each particular combination of torque command, angular speed (ωr) of the rotor/shaft, the DC input voltage and total RMS current signal ($I_{rmstotal}$), and thus maximize torque/ampere.

Figure 4:
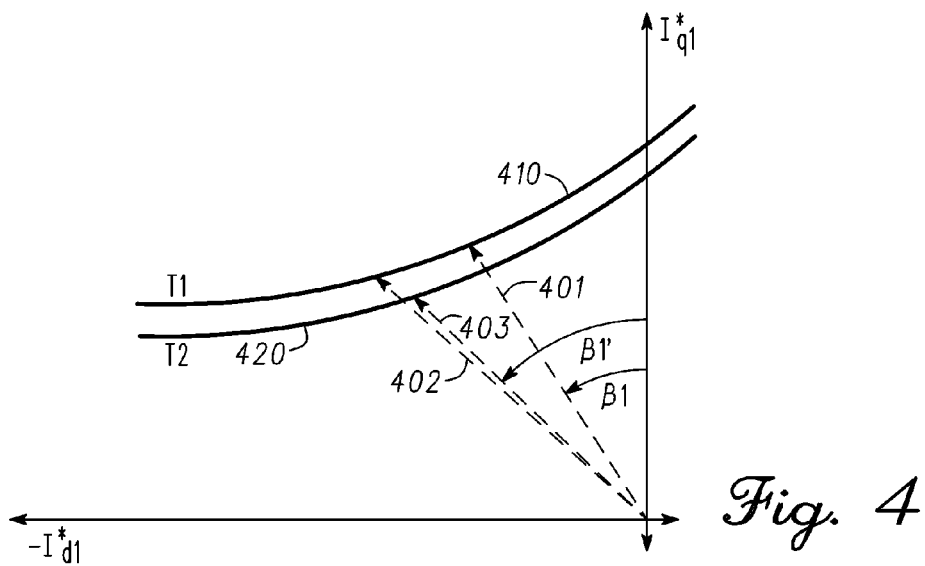
FIG. 4 is a graph that illustrates three possible fundamental current vectors with respect to constant torque lines (T1, T2)

FIG. 4 is a graph that illustrates three possible fundamental current vectors 401-403 with respect to constant torque lines (T1, T2) 410, 420. For sake of clarity and simplicity, only fundamental current vectors 401-403 are illustrated in FIG. 4, and corresponding third harmonic current vectors are not illustrated. Each fundamental current vector has a magnitude that is defined by its length and an angle (β). The magnitude of each fundamental current vector 401-403 is determined by equation (5) (above), where Id1* is the fundamental d-axis current command signal (Id1*) 142, which is ideally equal to the fundamental synchronous reference frame d-axis current signal (Id1) 132, and where Iq1* is the fundamental q-axis current command signal (Iq1*) 144, which is ideally equal to the fundamental synchronous reference frame q-axis current signal (Iq1) 134. The fundamental current vectors 402 and 403 each have an angle β1', whereas the fundamental current vector 401 has a smaller angle β.

Each fundamental current vector 401-403 touches a constant torque curve 410, 420. In this example, the constant torque curves 410, 420 are a collection of points where the five-phase machine will generate a particular torque value T1, T2, respectively. In particular, fundamental current vectors 401 and 402 each correspond to a torque T1 (e.g., each has a combination of magnitude and angle such that it touches and terminates at the constant torque line (T1) 410). By contrast, fundamental current vector 403 has a lower torque (T2) (e.g., has a combination of magnitude and angle such that it touches and terminates at the constant torque line (T2) 420).

Table 1 compares relative magnitude, relative angle (β), and relative torque of the three fundamental current vectors 401-403. As shown in Table 1, it is to be understood that in FIG. 4 is intended to illustrate that vectors 401 and 403 have the same magnitude but different angles, whereas that vectors 402 and 403 have different magnitudes but the same angle.

TABLE 1

| Vector | Relative fundamental current magnitude | Relative fundamental current angle (β) | Relative torque |
|---|---|---|---|
| 401 | small | β1 (small) | T1 (larger) |
| 402 | larger | β1' (larger) | T1 (larger) |
| 403 | small | β1' (larger) | T2 (small) |

Of the three fundamental current vectors 401, 402, 403, the fundamental current vector 401 has the best torque (Newton-meters)/RMS current (ampere).

To explain further, a given torque (T1) can be achieved using different combinations of magnitudes and angles. For instance, fundamental current vectors 401, 402 both result in torque T1 even though fundamental current vector 401 has a smaller magnitude since it also has a smaller angle. Stated differently, the fundamental current vector 401 and fundamental current vector 402 produce the same torque (T1), but fundamental current vector 401 does so using a smaller RMS current magnitude and smaller angle (β).

By contrast, the fundamental current vector 401 and fundamental current vector 403 both have a relatively small RMS current magnitude, but fundamental current vector 401 results in a higher torque (T1) since it has a smaller angle (β1).

Fundamental current vector 402, 403 have the same angle, but fundamental current vector 402 has a greater magnitude and hence greater torque (T1>T2).

Thus, decreasing the fundamental current angle (β) from β1' to β1 still allows for a relatively larger torque (T1) even though RMS current magnitude is smaller, and will increase torque/ampere. As will be explained below with respect to FIGS. 5A-6B, to meet a given commanded torque, decreasing the value of the fundamental current angle (β) is a better option than increasing magnitude of RMS current because it will result in more torque/amp.

Figure 5A:
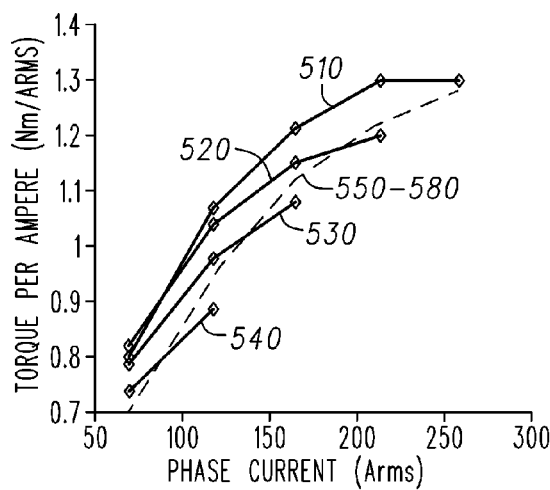
FIG. 5A is a graph of torque per ampere versus total RMS current magnitude of a particular phase current.

FIG. 5A is a graph of torque per ampere (Newton-meters/Ampere rms) versus total RMS current magnitude (Amperes rms) of a particular phase current. The particular phase current can be anyone of the phase currents Ia . . . Ie 122-126 since they will ideally all have the same RMS current in a balanced system. In particular, FIG. 5A shows four solid-line plots 510-540 of the particular phase current with third harmonic current being injected and four dashed-line plots 550-580 of the particular phase current without third harmonic current being injected. Plots in FIG. 5A were generated with the third harmonic current angle (β3) set to 115° and the fundamental current angle (β1) was decreased from 60° until the maximum phase voltage available was reached. The solid-line plot 510 of the particular phase current was generated by injecting a third harmonic current having a value that is 10% of the fundamental RMS phase current (i.e., a 10% injection factor). The solid-line plot 520 of the particular phase current was generated by injecting a third harmonic current having a value that is 20% of the fundamental RMS current (i.e., a 20% injection factor). The solid-line plot 530 of the particular phase current was generated by injecting a third harmonic current having a value that is 30% of the fundamental RMS current (i.e., a 30% injection factor). The solid-line plot 540 of the particular phase current was generated by injecting a third harmonic current having a value that is 40% of the fundamental RMS current (i.e., a 40% injection factor).

Figure 6A:
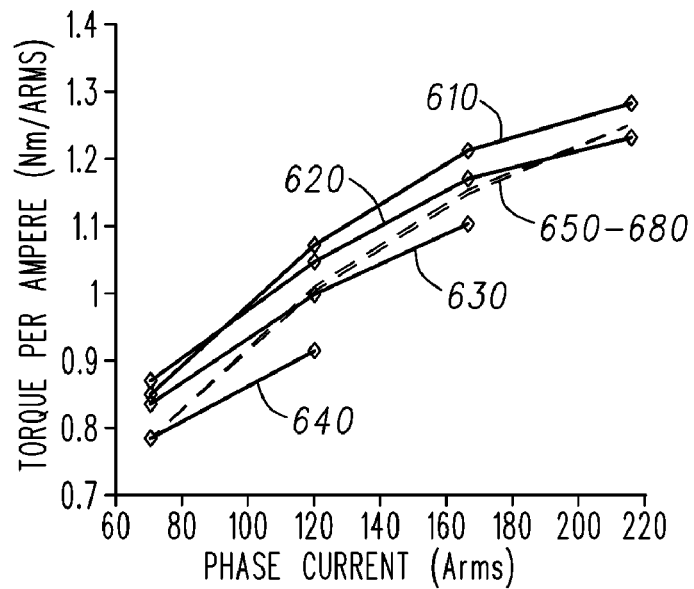
FIG. 6A is a graph of torque per ampere versus total RMS current magnitude of a particular phase current.

FIG. 6A is a graph of torque per ampere (Newton-meters/Ampere rms) versus total RMS current magnitude (Amperes rms) of a particular phase current. FIG. 6A shows four solid-line plots 610-640 of the particular phase current with third harmonic current being injected and four dashed-line plots 650-680 of the particular phase current without third harmonic current being injected. Plots in FIG. 6A were generated with the fundamental current angle (β1) set to 60°, and the third harmonic current angle (β3) set to 115°. In contrast to FIG. 5A, the fundamental current angle (β1) was kept constant in FIG. 6A, while the fundamental phase current was increased until the maximum phase voltage available was reached. A comparison of the torque per ampere (Newton-meters/Ampere rms) values from each of the plots 510-540 in FIG. 5A versus those 610-640 in FIG. 6A (i.e., when third harmonic current is injected) clearly shows that the torque per ampere increases when the fundamental current angle (β1) is decreased and other parameters remain the same.

Figure 5B:
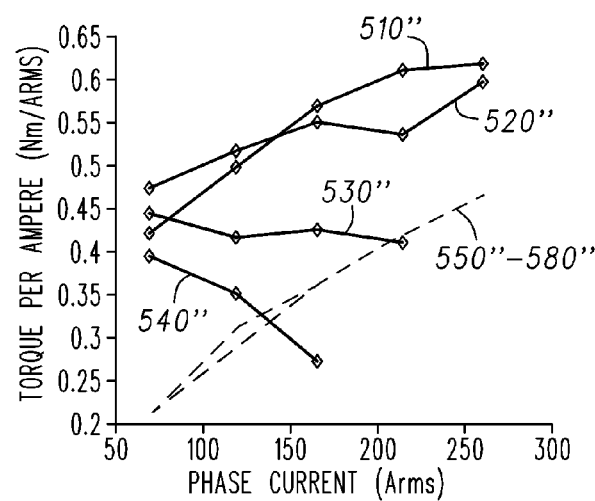
FIG. 5B is a graph of torque per ampere versus total RMS current magnitude of a particular phase current.
Figure 6B:
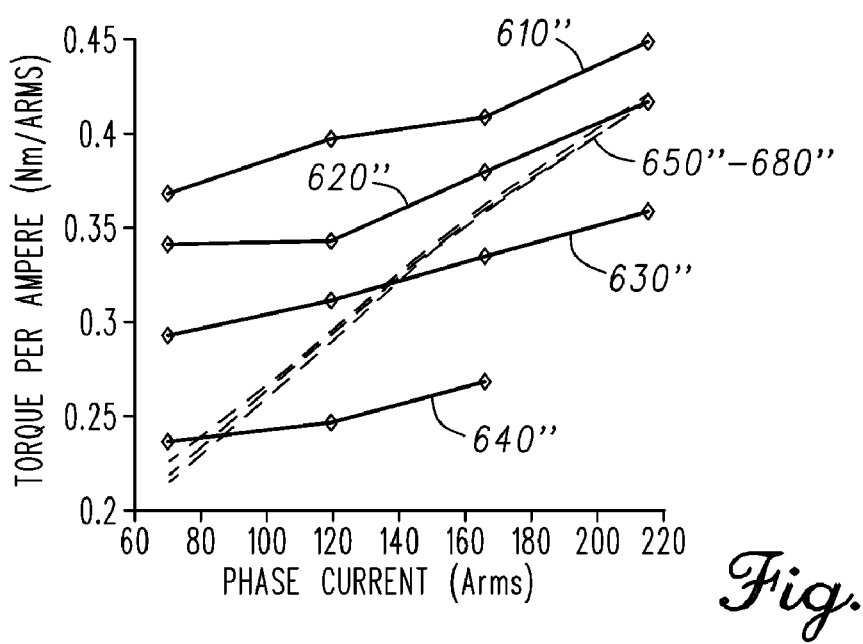
FIG. 6B is a graph of torque per ampere versus total RMS current magnitude of a particular phase current.

FIG. 5B is a graph of torque per ampere (Newton-meters/Ampere rms) versus total RMS current magnitude (Amperes rms) of a particular phase current. In particular, FIG. 5B shows four solid-line plots 510"-540" of the particular phase current with third harmonic current being injected and four dashed-line plots 550"-580" of the particular phase current without third harmonic current being injected. All plots in FIG. 5B were generated with the third harmonic current angle (β3) set to 115° and the fundamental current angle (β1) was decreased from 80° until the maximum phase voltage available was reached. The solid-line plot 510" of the particular phase current was generated by injecting a third harmonic current having a value that is 10% of the fundamental RMS current. The solid-line plot 520" of the particular phase current was generated by injecting a third harmonic current having a value that is 20% of the fundamental RMS current. The sold-line plot 530" of the particular phase current was generated by injecting a third harmonic current having a value that is 30% of the fundamental RMS current. The solid-line plot 540" of the particular phase current was generated by injecting a third harmonic current having a value that is 40% of the fundamental RMS current. In comparison to plots 510"-540" of FIG. 5B, the plots 610"-640" of FIG. 6B were generated when the magnitude of the RMS phase current was increased until the maximum phase voltage available was reached, while the fundamental current angle (β1) was kept constant. The torque per ampere (Newton-meters/Ampere rms) values in FIG. 6B are significantly less than those in FIG. 5B. Thus, increasing the magnitude of the RMS current has a negative effect on the torque per ampere (Newton-meters/Ampere rms) values. FIG. 5B clearly shows that decreasing the fundamental current angle (β1) improves significantly the torque per ampere (Newton-meters/Ampere rms) compared to increasing the RMS current while machine operating at the maximum phase voltage available (field-weakening region).

Table 2 below summarizes the results illustrated in FIGS. 5A-6B with respect to plots 510, 510", 610 and 610" when the RMS phase current equal to 150 Amperes and third harmonic current is injected at an injection factor equal to ten-percent of the fundamental current and when the third harmonic current angle (β3) is 115°.

| FIG. | Phase Current Plot | Fundamental Current Angle (β1) | Relative Phase Current Magnitude | Approximate Torque/RMS Current Ampere (Newton-meters/Ampere) |
|---|---|---|---|---|
| 5A | 510 | <60° | Low | 1.17 |
| 6A | 610 | 60° | High | 1.13 |
| 5B | 510" | <80° | Low | 0.54 |
| 6B | 610" | 80° | High | 0.41 |

Thus, when third harmonic current injection is implemented, the output torque-versus-total RMS phase current function is more sensitive to changes in the angle (β1) of the fundamental current vector than to changes in magnitude of the fundamental current vector. As such, output torque-versus-total RMS phase current can be maximized more easily by optimizing the angle (β1) (as opposed to maximizing the magnitude of the fundamental current vector) while the maximum phase voltage available is used in field-weakening region. Accordingly, in the disclosed embodiments, the fundamental current angle (β1) of the fundamental current vector is minimized to increase the ratio of torque-to-total RMS phase current ($I_{rmstotal}$) and to maximize voltage utilization in the multi-phase system.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for improving voltage utilization in a five-phase vector controlled machine drive system that employs third harmonic current injection to increase torque and power output by a five-phase machine having a rotor that rotates at a variable angular speed, the method comprising:
   receiving a combination of inputs comprising a torque command, angular speed of the rotor, and a DC input voltage; and
   generating, based on the combination of inputs, an optimized fundamental current angle of a fundamental current vector.

2. A method according to claim 1, wherein the step of generating, based on the combination of inputs, an optimized fundamental current angle of a fundamental current vector, further comprises:
   generating, based on the combination of inputs:
     a first value for a total root mean square (RMS) current corresponding to the combination of inputs;
     a second value for a third harmonic current injection factor;
     a third value for a third harmonic current angle; and
     a fourth value of the fundamental current angle, wherein the second value and the third value are designed to optimize the fourth value of the fundamental current angle.

3. A method according to claim 2, wherein the first value for the total RMS current corresponds to a particular torque/speed and DC input voltage operating point that is defined based on the combination of inputs.

4. A method according to claim 3, wherein the second value and the third value are designed to optimize the fourth value to increase a value of a ratio of torque-to-total RMS phase current.

5. A method according to claim 3, wherein the second value, the third value and the fourth value are designed to increase the value of the ratio of output torque-to-total RMS phase current at the first value of the total RMS current to improve phase voltage utilization by the five-phase machine.

6. A method according to claim 2, wherein the step of generating further comprises:
   generating a third harmonic RMS current signal and a fundamental RMS current signal based on the total RMS current and the third harmonic current injection factor; and
   based on the fundamental RMS current signal, the third harmonic RMS current signal, the fundamental current angle, and the third harmonic current angle, generating a plurality of synchronous reference frame current command signals comprising: fundamental synchronous reference frame current command signals and third harmonic synchronous reference frame current command signals.

7. A five-phase system, comprising:
   a five-phase machine having a rotor that rotates at a variable angular speed; and
   a torque-to-current mapping module designed to:
   receive a combination of inputs comprising a torque command, angular speed of the rotor, and a DC input voltage;
   generate, based on the combination of inputs, an optimized fundamental current angle of a fundamental current vector; and
   generate, based on the optimized fundamental current angle, a plurality of synchronous reference frame current command signals comprising: fundamental synchronous reference frame current command signals.

8. A five-phase system according to claim 7, wherein the torque-to-current mapping module comprises:
   a torque-to-current command table designed to generate in response to the combination of inputs:
     a first value for a total root mean square (RMS) current corresponding to the combination of inputs;
     a second value for a third harmonic current injection factor;

a third value for a third harmonic current angle; and a fourth value of the fundamental current angle, wherein the second value and the third value are designed to optimize the fourth value of the fundamental current angle.

9. A five-phase system according to claim 8, wherein the first value for the total RMS current corresponds to a particular torque/speed and DC input voltage operating point that is defined based on the combination of inputs.

10. A five-phase system according to claim 9, wherein the second value and the third value are designed to optimize the fourth value to increase a value of a ratio of torque-to-total RMS phase current.

11. A five-phase system according to claim 9, wherein the second value, the third value and the fourth value are designed to increase the value of the ratio of output torque-to-total RMS phase current at the first value of the total RMS current to maximize phase voltage utilization by the five-phase machine.

12. A five-phase system according to claim 8, wherein the torque-to-current mapping module further comprises:

a first current conversion module designed to generate a third harmonic RMS current signal and a fundamental RMS current signal based on the total RMS current and the third harmonic current injection factor.

13. A five-phase system according to claim 12, wherein the torque-to-current mapping module further comprises:

a second current conversion module designed to generate the synchronous reference frame current command signals based on the fundamental RMS current signal, the third harmonic RMS current signal, the fundamental current angle, and the third harmonic current angle.

14. A five-phase system according to claim 7, wherein the plurality of synchronous reference frame current command signals further comprise third harmonic synchronous reference frame current command signals, and further comprising:

a stationary-to-synchronous transformation module designed to generate synchronous reference frame current signals comprising: fundamental synchronous reference frame current signals and third harmonic synchronous reference frame current signals; and a synchronous frame current regulator module designed to generate a plurality of synchronous reference frame voltage command signals based on corresponding ones of the synchronous reference frame current command signals and corresponding ones of the synchronous reference frame current signals.

15. A five-phase system that employs third harmonic current injection, the system comprising:

a five-phase machine; and a control loop that controls the five-phase machine, the control loop being designed to:

generate an optimized fundamental current angle of a fundamental current vector that is optimized to reduce total RMS phase current and to increase a ratio of output torque-to-total RMS phase current for a particular torque command, angular rotor speed and DC input voltage; and generate a plurality of synchronous reference frame current command signals based on the total RMS phase current and the optimized fundamental current angle.

16. A five-phase system according to claim 15, wherein the five-phase machine has a rotor that rotates at an angular speed, and wherein the control loop is designed to:

receive a combination of inputs comprising a torque command, angular speed of the rotor, and a DC input voltage;

generate, based on the combination of inputs, an optimized fundamental current angle of a fundamental current vector; and generate, based on the optimized fundamental current angle, the plurality of synchronous reference frame current command signals comprising: fundamental synchronous reference frame current command signals and third harmonic synchronous reference frame current command signals.

17. A five-phase system according to claim 16, wherein the control loop comprises:

a torque-to-current command table designed to generate in response to the combination of inputs:

a first value for a total root mean square (RMS) current corresponding to the combination of inputs;

a second value for a third harmonic current injection factor;

a third value for a third harmonic current angle; and a fourth value of the fundamental current angle, wherein the second value and the third value are designed to optimize the fourth value of the fundamental current angle.

18. A five-phase system according to claim 17, wherein the first value for the total RMS current corresponds to a particular torque/speed and DC input voltage operating point that is defined based on the combination of inputs, and wherein the second value and the third value are designed to optimize the fourth value to increase a value of a ratio of torque-to-total RMS phase current at the first value of the total RMS current to maximize phase voltage utilization by the five-phase machine.

19. A five-phase system according to claim 18, wherein the control loop further comprises:

a first current conversion module designed to generate a third harmonic RMS current signal and a fundamental RMS current signal based on the total RMS current and the third harmonic current injection factor; and a second current conversion module designed to generate the synchronous reference frame current command signals based on the fundamental RMS current signal, the third harmonic RMS current signal, the fundamental current angle, and the third harmonic current angle.

20. A five-phase system according to claim 19, further comprising:

a stationary-to-synchronous transformation module designed to generate the synchronous reference frame current signals comprising: fundamental synchronous reference frame current signals and third harmonic synchronous reference frame current signals; and a synchronous frame current regulator module designed to generate a plurality of synchronous reference frame voltage command signals based on corresponding ones of the synchronous reference frame current command signals and corresponding ones of the synchronous reference frame current signals.

* * * * *